US012597675B2

(12) United States Patent
Lee et al.

(10) Patent No.: US 12,597,675 B2
(45) Date of Patent: Apr. 7, 2026

(54) POUCH-TYPE BATTERY CELL INCLUDING VENTING MEMBER AND BATTERY PACK INCLUDING THE SAME

(71) Applicant: LG Energy Solution, Ltd., Seoul (KR)

(72) Inventors: Ji Su Lee, Daejeon (KR); Jun Soo Park, Daejeon (KR); Bum Young Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 17/992,459

(22) Filed: Nov. 22, 2022

(65) Prior Publication Data

US 2023/0079811 A1      Mar. 16, 2023

Related U.S. Application Data

(62) Division of application No. 16/977,389, filed as application No. PCT/KR2019/016541 on Nov. 28, 2019, now Pat. No. 11,522,249.

(30) Foreign Application Priority Data

Dec. 7, 2018    (KR) ........................ 10-2018-0157169

(51) Int. Cl.
*H01M 50/317*      (2021.01)
*H01M 50/10*        (2021.01)
(Continued)

(52) U.S. Cl.
CPC ......... *H01M 50/317* (2021.01); *H01M 50/10* (2021.01); *H01M 50/105* (2021.01); (Continued)

(58) Field of Classification Search
CPC . H01M 50/30; H01M 50/342; H01M 50/3425
See application file for complete search history.

(56) References Cited

U.S. PATENT DOCUMENTS

| | | | |
|---|---|---|---|
| 6,187,472 B1 | 2/2001 | Shiota et al. | |
| 2011/0005781 A1* | 1/2011 | Yasui | ................. H01M 10/486 169/54 |

(Continued)

FOREIGN PATENT DOCUMENTS

| | | |
|---|---|---|
| CN | 104062597 A | 9/2014 |
| CN | 104485479 A | 4/2015 |

(Continued)

OTHER PUBLICATIONS

Espacenet machine translation of Kanda (JP-2011249428-A) (Year: 2011).*

(Continued)

*Primary Examiner* — Haroon S. Sheikh
(74) *Attorney, Agent, or Firm* — Lerner David LLP

(57)      ABSTRACT

A pouch-type battery cell includes a battery case including a metal layer and polymer resin layer, and an electrode assembly disposed within the battery case, the battery case further including an electrode assembly receiving part formed in at least one of an upper case and a lower case of the battery case, and a venting member disposed on an outer surface of the electrode assembly receiving part at a location adjacent to a sealing part of the battery case, wherein the venting member is made of a shape memory alloy that is deformed to penetrate the battery case when a temperature of the venting member increases to a value above a transition temperature of the shape memory alloy. A battery module including the pouch-type battery cell, and a battery pack are also provided.

7 Claims, 7 Drawing Sheets

(51) Int. Cl.

| | |
|---|---|
| *H01M 50/105* | (2021.01) |
| *H01M 50/116* | (2021.01) |
| *H01M 50/143* | (2021.01) |
| *H01M 50/202* | (2021.01) |
| *H01M 50/342* | (2021.01) |

(52) U.S. Cl.
CPC ....... *H01M 50/116* (2021.01); *H01M 50/143* (2021.01); *H01M 50/202* (2021.01); *H01M 50/3425* (2021.01)

(56) References Cited

U.S. PATENT DOCUMENTS

| | | | |
|---|---|---|---|
| 2011/0129702 | A1 | 6/2011 | Ahn et al. |
| 2012/0003517 | A1 | 1/2012 | Choi et al. |
| 2012/0164491 | A1 | 6/2012 | Schaefer et al. |
| 2014/0147712 | A1 | 5/2014 | Lee |
| 2014/0212710 | A1 | 7/2014 | Min |
| 2015/0086817 | A1 | 3/2015 | Chung et al. |
| 2018/0090728 | A1* | 3/2018 | Song .................. H01M 10/482 |

FOREIGN PATENT DOCUMENTS

| | | | | | |
|---|---|---|---|---|---|
| CN | 205488409 | U | 8/2016 | | |
| CN | 206451090 | U | 8/2017 | | |
| JP | H1064497 | A | 3/1998 | | |
| JP | H10294097 | A | 11/1998 | | |
| JP | 2003168410 | A | 6/2003 | | |
| JP | 2006185708 | A | 7/2006 | | |
| JP | 2010225496 | A | 10/2010 | | |
| JP | 2011233604 | A | 11/2011 | | |
| JP | 2011249428 | A | 12/2011 | | |
| JP | 2013037873 | A | 2/2013 | | |
| JP | 2014527703 | A | 10/2014 | | |
| JP | 2015526851 | A | 9/2015 | | |
| KR | 20060091788 | A | 8/2006 | | |
| KR | 20080015164 | A | 2/2008 | | |
| KR | 100886570 | B1 | 3/2009 | | |
| KR | 100904374 | B1 | 6/2009 | | |
| KR | 20110075789 | A | 7/2011 | | |
| KR | 101093937 | B1 | 12/2011 | | |
| KR | 101136274 | B1 | 4/2012 | | |
| KR | 20130019477 | A | 2/2013 | | |
| KR | 101292618 | B1 | 8/2013 | | |
| KR | 20150023114 | A | 3/2015 | | |
| KR | 101527256 | B1 | 6/2015 | | |
| KR | 20160021347 | A | 2/2016 | | |
| KR | 20190019461 | A | * 2/2019 | ......... | H01M 50/116 |
| WO | 2011132723 | A1 | 10/2011 | | |

OTHER PUBLICATIONS

Espacenet machine translation of Choi et al. (KR-20190019461-A) (Year: 2019).*

Espacenet machine translation of CN205488409U (Year: 2016).*

Extended European Search Report for Application No. 19892400.3, dated Mar. 31, 2021, 9 pages.

International Search Report for Application No. PCT/KR2019/016541, mailed Mar. 31, 2020, pp. 1-2.

Search Report dated Mar. 31, 2022 from Office Action for Chinese Application No. 201980011638.6 issued Mar. 25, 2022. 3 pgs.

\* cited by examiner

<u>10</u>

( a )

<u>20</u>

( b )

<u>30</u>

( c )

300

<u>500</u>

POUCH-TYPE BATTERY CELL INCLUDING VENTING MEMBER AND BATTERY PACK INCLUDING THE SAME

CROSS-REFERENCE TO RELATED APPLICATIONS

This application is a divisional of U.S. patent application Ser. No. 16/977,389, filed Sep. 1, 2020, which is a national phase entry under 35 U.S.C. § 371 of International Application No. PCT/KR2019/016541, filed Nov. 28, 2019, published in Korean, which claims the benefit of priority to Korean Patent Application No. 10-2018-0157169 filed on Dec. 7, 2018, the disclosures of which are hereby incorporated by reference herein their entireties.

TECHNICAL FIELD

The present invention relates to a pouch-type battery cell including a venting member and a battery pack including the same. Specifically, the present invention relates to a pouch-type battery cell and, and a battery pack including the same, the pouch-type battery cell capable of inducing the venting of a battery cell by adding a venting member made of a shape memory alloy material on an outer surface of the pouch-type battery cell, or an inner surface of an battery pack case including the pouch-type battery cell.

BACKGROUND ART

As an energy source capable of repeatedly charging and discharging portable electronic products such as mobile phones, tablet PCs, and vacuum cleaners, the demand for secondary batteries is rapidly increasing. Research and development of secondary batteries for application to devices requiring high capacity and high efficiency, such as electric vehicles and power storage devices, are in progress.

In particular, among secondary batteries, lithium secondary batteries having advantages such as high energy density, high voltage, high power, and excellent life characteristics are widely used.

The lithium secondary batteries may be classified based on the shape of a case. For example, there is a cylindrical battery or a prismatic battery, each of the cylindrical battery and the prismatic battery is configured to have an electrode assembly mounted in a metal can, and there is a pouch-type battery, the pouch-type battery is configured to have an electrode assembly mounted in a pouch-type case made of an aluminum laminate sheet. The pouch-type battery has an advantage that it can freely change in shape because it can be easily curved or bent.

In general, a lithium secondary battery includes an electrode active material, a binder, and an electrolyte constituting an electrode as main components, which are electrochemically stable at operating voltages ranging from 2.5V to 4.3V. However, when the voltage of the lithium secondary battery rises above the operating voltage, the components are decomposed to generate gas, and thus the lithium secondary battery is expanded and deformed due to the generated gas. In addition, when a separator is damaged by an inorganic material included in the electrode mixture, contact between a positive electrode and a negative electrode may cause a large amount of current to flow and promote the generation of heat and gas, which may cause ignition and explosion of the secondary battery.

In order to remove the gas generated inside the battery, the cylindrical battery and the prismatic battery are provided with a safety device such as a vent in a cap assembly, while the pouch-type battery only determines venting by the sealing strength without a separate safety device. However, there is a problem that it is difficult to guide venting under desired conditions.

In this regard, Korean Patent No. 0886570 discloses a secondary battery in which an opening communicating with an interior is formed in a battery case and a safety opening and closing portion of a shape memory alloy capable of opening and closing the opening is added.

Korean Patent No. 0886570 uses a structure for opening and closing the opening in a pouch case of the state in which the opening was formed. However, since the safety opening and closing portion is applied to a sealing part of the pouch battery, there is a problem that a dead space occurs in the width direction of the battery cell because a structure in which the sealing part is bent is not applicable.

Korean Patent Application Publication No. 2013-0019477 relates to a secondary battery having a form of opening through a pouch while a bent-shape of shape memory alloy is being unbent when the temperature rises.

However, Korean Patent Application Publication No. 2013-0019477 is not preferable because the shape memory alloy is located inside the pouch-type battery, and there is a problem that the shape memory alloy generates side reactions with the electrolyte and the like.

As such, in order to discharge the gas generated inside the pouch-type battery cell at a desired temperature, there is an urgent need for a technology that can set the discharge temperature of the gas and can prevent the ignition and explosion caused by the increased internal pressure of the secondary battery.

DISCLOSURE

Technical Problem

The present invention has been made in view of the above problems, and it is an object of the present invention to provide a pouch-type battery cell capable of discharging gas in the battery cell at a desired temperature by applying a venting member made of a shape memory alloy on an outer surface of the pouch-type battery cell.

Technical Solution

In accordance with the present invention, the above and other objects can be accomplished by the provision of a pouch-type battery cell comprising a battery case including a metal layer and a polymer resin layer, and an electrode assembly disposed within the battery case, wherein the battery case may further include an electrode assembly receiving part formed in at least one of an upper case and a lower case of the battery case, and a venting member disposed on an outer surface of the electrode assembly receiving part at a location adjacent to a sealing part of the battery case, the venting member made of a shape memory alloy that is deformed to penetrate the battery case when a temperature of the venting member increases to a value above a transition temperature of the shape memory alloy.

The venting member may be formed in a straight shape when the temperature of the venting member is at or below the transition temperature, and at least one end of the venting member may be bent when the temperature of the venting member is above the transition temperature.

A deformed portion of the venting member may have a pointed end.

The electrode assembly receiving part is formed in both the upper case and the lower case; the electrode assembly may be a unidirectional electrode assembly in which electrode terminals are formed in one direction; and the location at which the venting member may be disposed on the outer surface of the electrode assembly receiving part is adjacent to the sealing part where the electrode terminals are disposed.

The electrode assembly receiving part is formed in both the upper case and the lower case; the electrode assembly may be a bidirectional electrode assembly in which electrode terminals are formed in both directions; and the location at which the venting member may be disposed on the outer surface of the electrode assembly receiving part is adjacent to the sealing part where the electrode terminals are disposed or adjacent to the sealing part where the electrode terminals are not disposed.

The location at which the venting member may be disposed on the outer surface of the electrode assembly receiving part in a direction in which the electrode terminal is not disposed is among side surfaces of the electrode assembly receiving part.

The venting member may be disposed between a bent sealing part of the battery case and a side surface of the electrode assembly receiving part facing the bent sealing part.

The present invention also provides a battery module including one or more pouch-type battery cells, wherein the battery module may include the one or more pouch-type battery cells, a housing configured to receive the one or more pouch-type battery cells, and a venting member configured to discharge internal gas in at least one of the one or more pouch-type battery cells. The venting member may be attached to a position on an inner surface of the housing facing the sealing part of at least one of the one or more pouch-type battery cells.

The position to which the venting member may be attached faces the sealing part in a direction in which electrode terminals of the pouch-type battery cell are disposed.

The position to which the venting member may be attached faces the sealing part in a direction in which electrode terminals of the pouch-type battery cell are not disposed.

The present invention also provides a battery pack configured to receive the pouch-type battery cell or a battery module including the pouch-type battery cell therein, in which the battery pack may include a venting member configured to penetrate a battery case of the pouch-type battery cell by deforming its shape due to a change of temperature, the venting member being added to an end plate coupled to electrode terminals of the pouch-type battery cell or a cooling fin contacting the pouch-type battery cell.

BEST MODE

Figure 1:
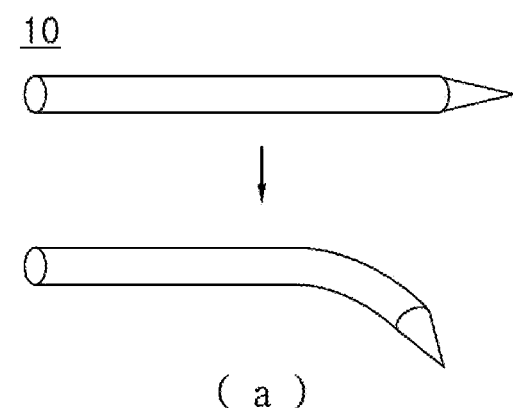
FIG. 1 is a perspective view showing venting members before and after deformation of the venting members.
Figure 1:
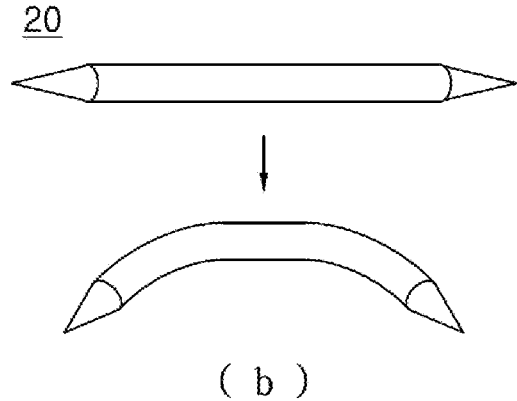
Figure 1:
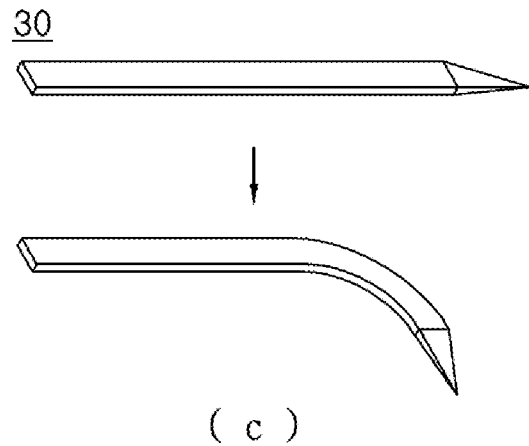

Hereinafter, preferred embodiments of the present invention will be described in detail with reference to the accompanying drawings such that the preferred embodiments of the present invention can be easily implemented by those skilled in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the another part, but also, the one part may be indirectly connected to the another part via a further part. In addition, that a certain element is included does not mean that other elements are excluded, but means that such elements may be further included unless mentioned otherwise.

A pouch-type battery cell according to the present invention may comprise a battery case including a metal layer and a polymer resin layer, wherein the battery case may include an electrode assembly receiving part formed on at least one of an upper case and a lower case, and a venting member disposed on an outer surface of the electrode assembly receiving part, which is an adjacent portion of a sealing part of the battery case, and the venting member made of a shape memory alloy that is deformed to penetrate the battery case when the temperature of the battery cell increases.

The battery case may be configured to have a structure including an outer resin layer made of a material that is not affected by the external environment; a metal layer for preventing inflow of gas and moisture and for preventing leakage of electrolyte; and an inner resin layer for sealing the battery case.

The electrode assembly may be classified into a jelly-roll type (wound type) electrode assembly, which is configured to have a structure in which long sheet type positive electrodes and long sheet type negative electrodes are wound in the state in which separators are interposed respectively between the positive electrodes and the negative electrodes, a stacked type electrode assembly, which is configured to have a structure in which a plurality of positive electrodes cut so as to have a predetermined size and a plurality of negative electrodes cut so as to have a predetermined size are sequentially stacked in the state in which separators are interposed respectively between the positive electrodes and the negative electrodes, a stacked/folded type electrode assembly, which is configured to have a structure in which bi-cells or full cells, each of which is configured to have a structure in which predetermined numbers of positive electrodes and negative electrodes are stacked in the state in which separators are disposed respectively between the positive electrodes and the negative electrodes, are wound using a separation sheet, or a laminated/stacked type electrode assembly, which is configured to have a structure in which bi-cells or full cells are stacked and laminated in the state in which separators are disposed respectively between the bi-cells or the full cells.

The electrode assembly may be configured to have only one type of electrode assembly, or may be configured to have two or more types of electrode assemblies having different shapes.

When the electrode assemblies are configured to have two or more types of electrode assemblies, the electrode assembly receiving part may have a stepped structure in consideration of the fact that the size of the electrode assemblies may be different from each other on a plane.

The venting member may be made of a shape memory alloy, which is a metal alloy having a property of returning to its original shape before deformation when it is above the transition temperature, even if the deformation state is maintained at or below the transition temperature. The shape memory alloy may typically be made of a titanium-nickel-based alloy or a copper-zinc-aluminum-based alloy.

The venting member may be formed in a straight shape at a normal temperature, and at least one end thereof may be bent when the temperature increases. Thus, as the venting member is bent in an inward direction of the battery case, a through hole is formed in the battery case to discharge gas.

Hereinafter, a normal temperature form of a venting member is referred to as a deformed form (state), and returning to the form of the venting member before deformation above the transition temperature is referred to as a recovered form (state).

In order to easily form a through hole for discharging gas, the venting member may have a pointed shape at the end of the portion to be deformed and recovered.

In this regard, FIG. 1 shows a perspective view of venting members before and after deformation of the venting members.

Referring to FIG. 1, a venting member 10 has a generally thin cylindrical shape, and is deformed in a straight form at a normal temperature. However, when the venting member 10 is above the transition temperature, a right end of the venting member 10 is bent because the venting member 10 is recovered to the form before deformation.

The venting member 10 has a flat left end that does not bend above the transition temperature, while the right end of the venting member 10 is bent at a temperature above the transition temperature and has a pointed shape. Therefore, it is advantageous to form a through hole in the battery case.

A venting member 20 has a generally thin cylindrical shape, and is deformed in a straight form at a normal temperature. However, when the venting member 20 is above the transition temperature, both ends of the venting member 20 are bent in the same direction because the venting member 20 is recovered to the form before deformation.

The venting member 20 is formed in a pointed shape at the left and right ends that are bent when it is above the transition temperature.

A venting member 30 has a generally thin and flat rectangular pillar shape, and is deformed in a straight form at a normal temperature. However, when the venting member 30 is above the transition temperature, a right end of the venting member 30 is bent because the venting member 30 is recovered to the form before deformation.

The venting member 30 has a flat left end that does not bend above the transition temperature, while the right end of the venting member 30 is bent above the transition temperature and has a pointed shape. Therefore, it is advantageous to form a through hole in the battery case.

When the venting member according to the present invention becomes in a recovered form in a state where it is bent from a straight deformed form, a portion of the venting member penetrates through the battery case and is bent into the battery cell. Thus, a space for receiving the bent venting member inside the battery cell is required.

For example, when a stacked type electrode assembly is used as the electrode assembly, the space where an electrode tab and an electrode lead connecting part are positioned may be used as a space for receiving the bent venting member.

Figure 2:
FIG. 2 is a perspective view showing a pouch-type battery cell including a unidirectional electrode assembly and an electrode assembly receiving part formed only in an upper case.
Figure 2:
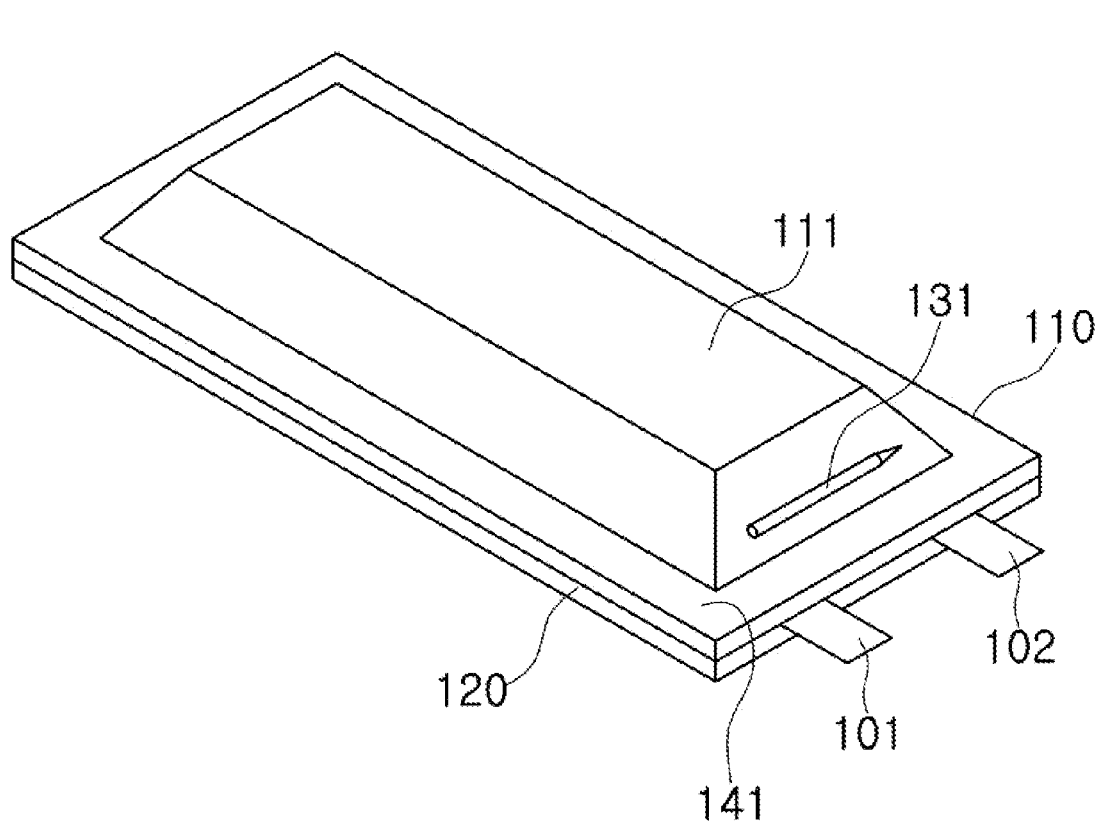

As a first embodiment according to the present invention, FIG. 2 shows a perspective view of a pouch-type battery cell including a unidirectional electrode assembly and an electrode assembly receiving part formed only in the upper case.

Referring to FIG. 2, a pouch-type battery cell 100 has a structure in which a sealing part of outer edges of an upper case 110, in which an electrode assembly receiving part 111 is formed, and a sealing part of outer edges of a lower case 120 of a flat shape are sealed.

The electrode assembly receiving part 111 is configured to receive a unidirectional electrode assembly in which a positive electrode terminal 101 and a negative electrode terminal 102 are formed in one direction. A venting member 131 is disposed on an outer surface of the electrode assembly receiving part 111, which is an adjacent portion of a sealing part 141 where the positive electrode terminal 101 and the negative electrode terminal 102 are disposed.

The venting member 131 may have a structure of any one of the venting members shown in FIG. 1 and becomes a recovered form as one end or both ends of the venting member are bent toward the battery case above the transition temperature. A through hole is formed in the battery case by the venting member which is in the recovered form, and internal gas of the battery cell can be discharged through the through hole.

However, it is preferable that the end of the bent venting member 131 is not in contact with the electrode terminals. Therefore, when using the unidirectional electrode assembly as shown in FIG. 2, the venting members 10 and 30, which are bent such that only one end thereof becomes the recovered form, may be used and the bent end of the venting member 131 may be received in the internal space of the battery cell disposed between the positive electrode terminal 101 and the negative electrode terminal 102.

Figure 3:
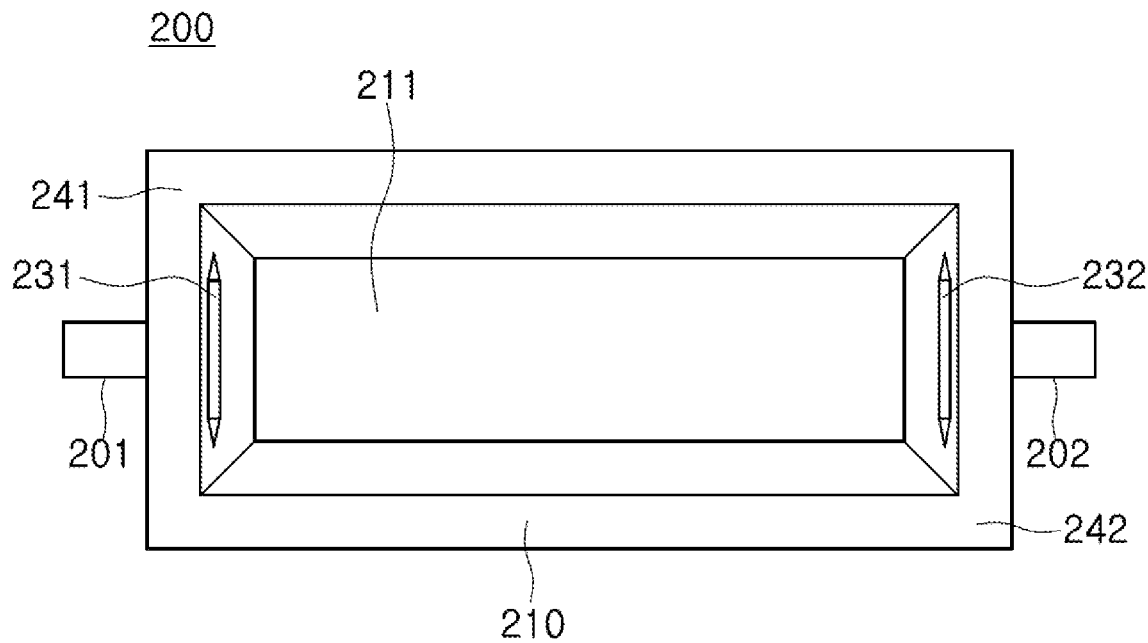
FIG. 3 is a plan view showing a pouch-type battery cell including a bidirectional electrode assembly.

As a second embodiment according to the present invention, FIG. 3 shows a plan view of a pouch-type battery cell including a bidirectional electrode assembly.

Referring to FIG. 3, a pouch-type battery cell 200 is configured to have an electrode assembly receiving part 211 formed in an upper case 210, and the electrode assembly receiving part 211 is configured to receive a bidirectional electrode assembly in which a positive electrode terminal 201 and a negative electrode terminal 202 protrude in opposite directions.

A lower case of the pouch-type battery cell 200 may be a flat shape or may have a structure in which an electrode assembly receiving part is formed.

A venting member 231 is disposed on an outer surface of the electrode assembly receiving part 211, which is an adjacent portion of a sealing part 241 where the positive electrode terminal 201 is disposed. A venting member 232 is disposed on an outer surface of the electrode assembly receiving part 211, which is an adjacent portion of a sealing part 242 where the negative electrode terminal 202 is disposed.

The venting member 231 may have a structure of any one of the venting members shown in FIG. 1 and becomes a recovered form as one end or both ends of the venting member are bent toward the battery case above the transition temperature. A through hole is formed in the battery case by the venting member which is in the recovered form, and internal gas of the battery cell can be discharged through the through hole.

When the pouch-type battery cell includes the bidirectional electrode assembly as shown in FIG. 3, it is preferable that a plurality of exhaust ports are formed so that internal gas of the battery cell can be discharged quickly. Thus, the venting members 231 and 232 may apply a recovered form such that both ends thereof are bent, as shown in the venting member 20 of FIG. 1. The bent ends of the venting members 231 and 232 may be received in the internal space of the battery cell disposed between the positive electrode terminal 201 and the negative electrode terminal 202.

The pouch-type battery cell 200 of FIG. 3 may have a structure in which an electrode assembly receiving part is formed in the lower case. In such case, venting members may be additionally added to each of an outer surface of the electrode assembly receiving part formed in the lower case, which is an adjacent portion to the sealing portion 241 where the positive electrode terminal 201 is disposed and an outer surface of the electrode assembly receiving part formed in the lower case, which is an adjacent portion of the sealing portion 242 where the negative terminal 202 is disposed.

When the electrode assembly receiving part is formed in each of the upper case and the lower case, the size of the electrode assembly may be increased, and thus gas generation due to internal side reactions in the battery cell may increase. Therefore, rapid exhaust can be achieved by adding the venting members to the upper case and the lower case, respectively. Moreover, when using a venting member in which both ends are deformed in a recovered form, such as the venting member 20 of FIG. 1, it is preferable to obtain a fast exhaust effect since the number of exhaust ports is increased.

Figure 4:
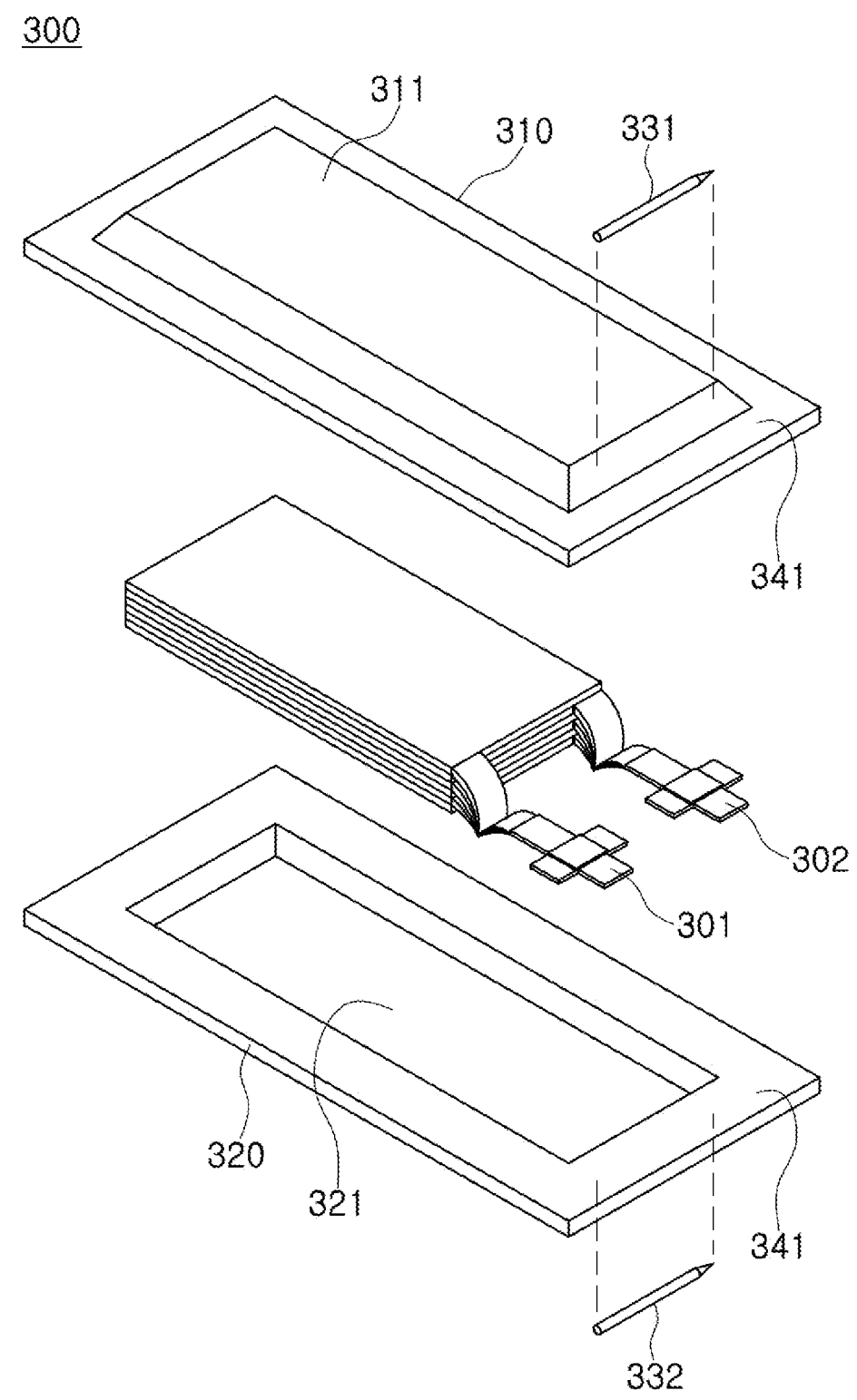
FIG. 4 is an exploded perspective view showing a pouch-type battery cell including a unidirectional electrode assembly and an electrode assembly receiving part formed in an upper case and a lower case.

As a third embodiment according to the present invention, FIG. 4 shows an exploded perspective view of a pouch-type battery cell including a unidirectional electrode assembly and an electrode assembly receiving part formed in an upper case and a lower case, respectively.

Referring to FIG. 4, a pouch-type battery cell 300 is configured to have an electrode assembly receiving part 311 formed in an upper case 310 and an electrode assembly receiving part 321 formed in a lower case 320. The pouch-type battery cell 300 has a structure in which the unidirectional electrode assembly in which a positive electrode terminal 301 and a negative electrode terminal 302 protrude in the same direction is received therein.

A venting member 331 is disposed on an outer surface of the electrode assembly receiving part 311 of the upper case 310, which is an adjacent portion of a sealing part 341 where the positive electrode terminal 301 and the negative electrode terminal 302 are disposed. A venting member 332 is disposed on an outer surface of the electrode assembly receiving part 321 of the lower case 320, which is an adjacent portion of the sealing part 341 where the positive electrode terminal 301 and the negative electrode terminal 302 are disposed.

As the pouch-type battery cell 300 uses the unidirectional electrode assembly, the venting members 331 and 332, such as the venting member 131 of FIG. 2, use a venting member in which only one end thereof is bent in a recovered form. The ends of the bent venting members 331 and 332 may be received in the battery cell internal space disposed between the positive electrode terminal 301 and the negative electrode terminal 302.

As in the pouch-type battery cells of FIGS. 2 to 4, when a venting member is disposed on an outer surface of an electrode assembly receiving part, which is an adjacent portion of a sealing part in a direction in which electrode terminals are disposed, the venting member is disposed in a deformed state at the adjacent portion of a sealing part where the electrode terminals are formed, and a bent portion of the venting member in a recovered state is received in a portion treated as dead space inside the battery cell. Thus, the problem of increasing the size of the battery cell can be prevented due to the addition of the venting member.

As a fourth embodiment according to the present invention, the venting member may be disposed on an outer surface of an electrode assembly receiving part in a direction in which electrode terminals are not disposed.

Figure 5:
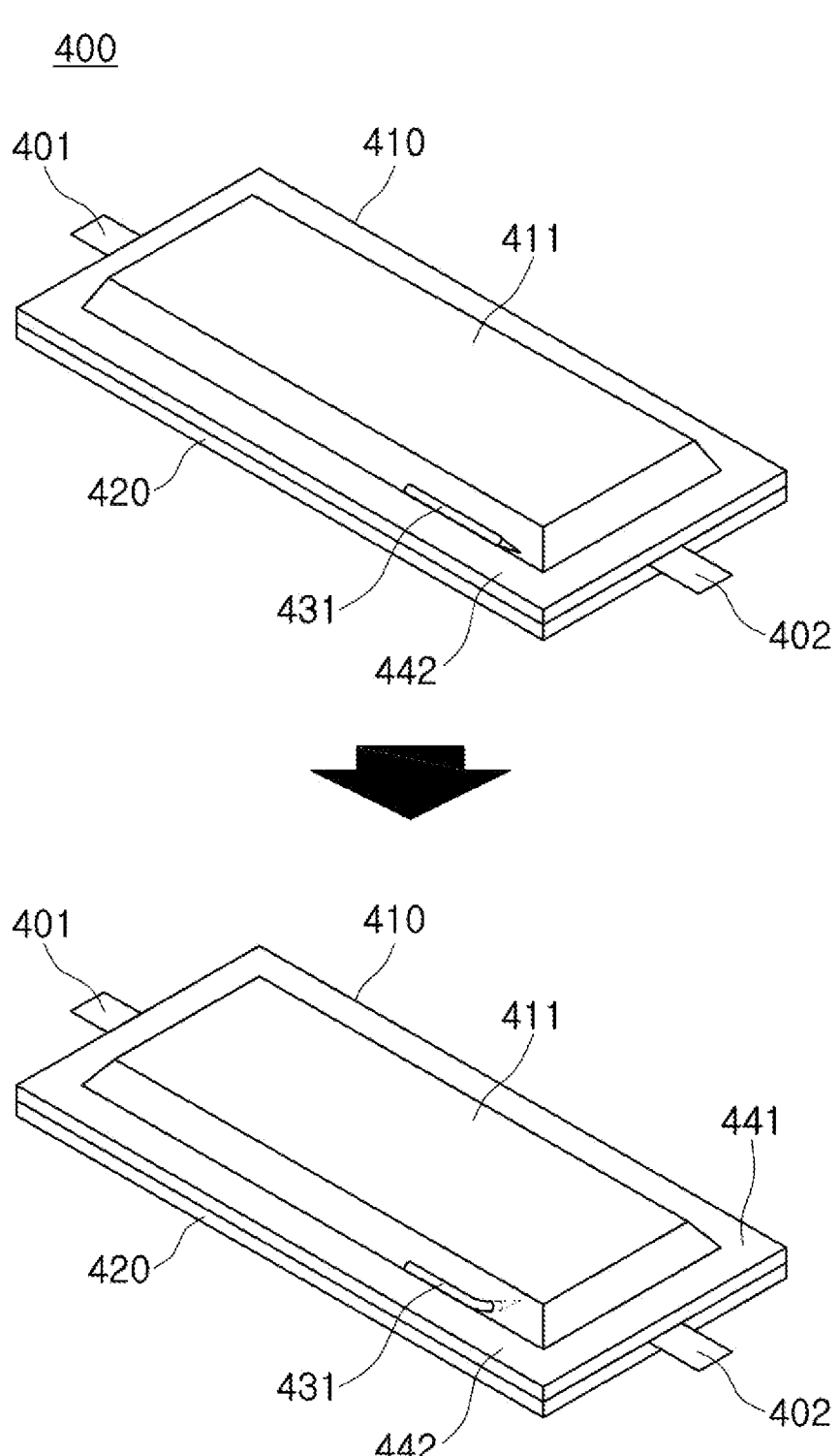
FIG. 5 is a perspective view showing a pouch-type battery cell including a bidirectional electrode assembly and having an electrode assembly receiving part formed only in an upper case.

In this regard, FIG. 5 shows a perspective view of a pouch-type battery cell including a bidirectional electrode assembly and having an electrode assembly receiving part formed only in an upper case.

Referring to FIG. 5, a pouch-type battery cell 400 may have an electrode assembly receiving part 411 formed on an upper case 410, and a lower case 420 may be a flat shape or may have a structure in which the electrode assembly receiving part is formed.

In the pouch-type battery cell 400, the electrode assembly receiving part 411 is configured to receive a bidirectional electrode assembly in which a positive electrode terminal 401 and a negative electrode terminal 402 protrude in opposite directions.

One or more venting members 431 may be disposed on outer surfaces of the electrode assembly receiving part 411 of the upper case 410, which are adjacent portions of sealing parts 441 and 442 where the positive electrode terminal 401 and the negative electrode terminal 402 are not disposed.

On the other hand, when an electrode assembly receiving part is formed in the lower case 420, a venting member may be additionally disposed on an outer surface of the electrode assembly receiving part of the lower case 420, which is an adjacent portion of the sealing parts 441 and 442 where the electrode terminals are not disposed.

Moreover, in addition to the venting member 431 disposed adjacent to the negative terminal 402, a venting member may be further added to a position adjacent to the positive electrode terminal 401 which is symmetrical thereto.

Unlike the venting members shown in FIGS. 2 to 4, the venting members 431 are disposed at the adjacent portions of the sealing parts where electrode terminals are not disposed, and thus it is preferable that only the ends of the venting members 431 in a direction close to the electrode terminals are in a recovered form. In addition, the ends of the recovered venting member may be received in the battery cell internal spaces disposed at both sides of the positive electrode terminal 401 and the negative electrode terminal 402.

In addition, the venting members 431 may be disposed on outer surfaces of the electrode assembly receiving part 411 of the upper case 410, which are adjacent portions of the sealing parts where the positive electrode terminal 401 and/or the negative electrode terminal 402 are disposed.

As a fifth embodiment according to the present invention, the venting member may be disposed between a bent sealing part of a battery case and a side surface of an electrode assembly receiving part facing the bent sealing part.

Figure 6:
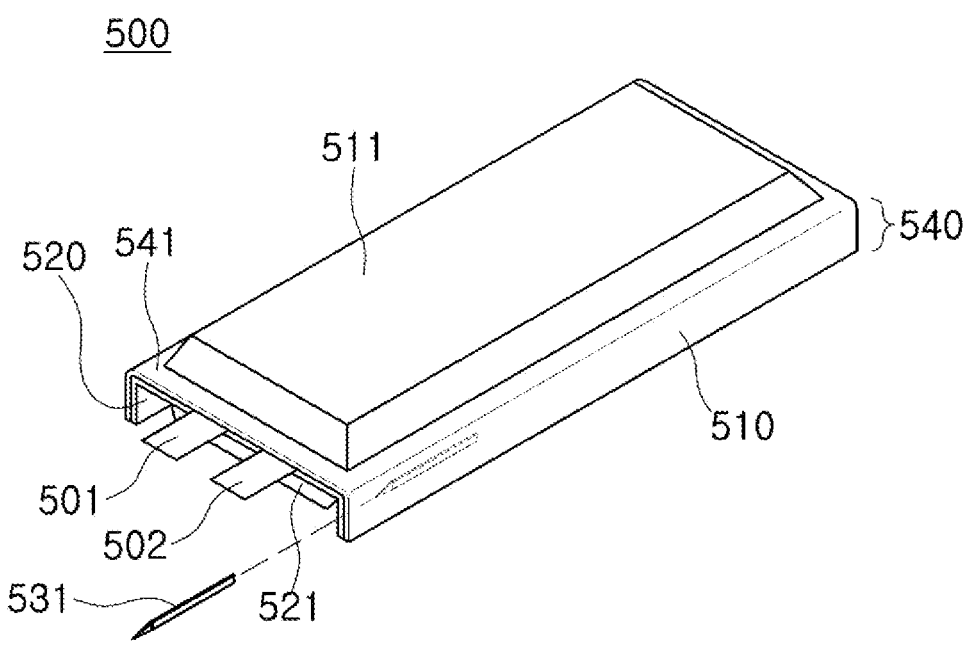
FIG. 6 is a perspective view showing a pouch-type battery cell in which a sealing part is bent.
Figure 6:
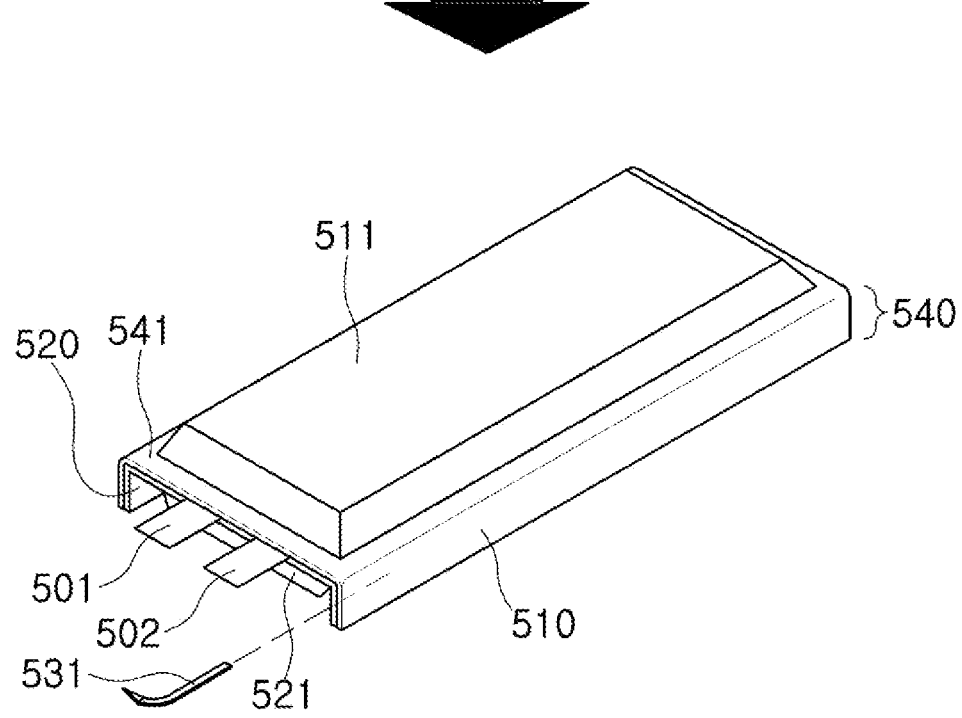

In this regard, FIG. 6 shows a perspective view of a pouch-type battery cell in which a sealing part is bent.

Referring to FIG. 6, a pouch-type battery cell 500 is configured to have an electrode assembly receiving part 511 formed in an upper case 510, and an electrode assembly receiving part 521 formed in a lower case 520. The pouch-type battery cell 500 has a structure in which a unidirectional electrode assembly in which a positive electrode terminal 501 and a negative electrode terminal 502 protrude in the same direction is received therein.

The pouch-type battery cell 500 is in a state in which a sealing part in a direction in which the electrode terminals do not protrude is bent, and thus a venting member 531 is disposed between a bent sealing part 540 and a side surface of the electrode assembly receiving part 521 of the lower case 520.

The venting member 531 has the same shape as the venting member 431 of FIG. 5, and thus only an end in a direction in which the negative electrode terminal 502 is disposed is in a recovered form that can penetrate the battery case.

In addition, a venting member may be further disposed between the opposite side of the bent sealing part 540 and the side surface of the electrode assembly receiving part. The end of the recovered venting member 531 may be received in the battery cell internal space outside the positive electrode terminal 501 and the negative electrode terminal 502.

In the case of the pouch-type battery cell 500, although the venting member is not disposed at an adjacent portion of a sealing portion 541 in a direction in which the electrode terminals are disposed, the venting member is disposed between the bent sealing part and the side surface of the electrode assembly receiving part. Thus, it is preferable to apply a thin and flat rectangular pillar-shaped venting member 30 such as the venting member 30 of FIG. 1.

The method of adding the venting member is not particularly limited as long as the venting member may be stably fixed to the outer surface of the pouch-type battery cell. For example, an adhesive material may be applied to the outer surface of the venting member to be attached, or an apparatus capable of physically mounting the venting member may be added and fixed.

Specifically, the venting member may be attached using an adhesive tape, or a groove or the like for inserting the venting member may be used by molding the pouch case. A method of attaching or physically fixing the venting member on the sealing part by using a separate member such as a clip for fitting the venting member to the pouch case or the electrode terminals may be used.

The present invention also provides a battery module including the pouch-type battery cell, wherein the battery module may include the pouch-type battery cell, a housing configured to receive one or more pouch-type battery cells, and a venting member configured to discharge gas in the pouch-type battery cell. The venting member may be attached to a position facing a sealing part of the pouch-type battery cell, which is an inner surface of the housing. In addition, it is possible to manufacture and use a housing including a structure for fitting the venting member into the inner surface of the housing or inserting the venting member to be mounted on the inner surface of the housing.

Specifically, the venting member may be attached or fixed to a position facing a sealing part in a direction in which electrode terminals of the pouch-type battery cell are disposed, or a position facing a sealing part in a direction in which electrode terminals of the pouch-type battery cell is not disposed.

Figure 7:
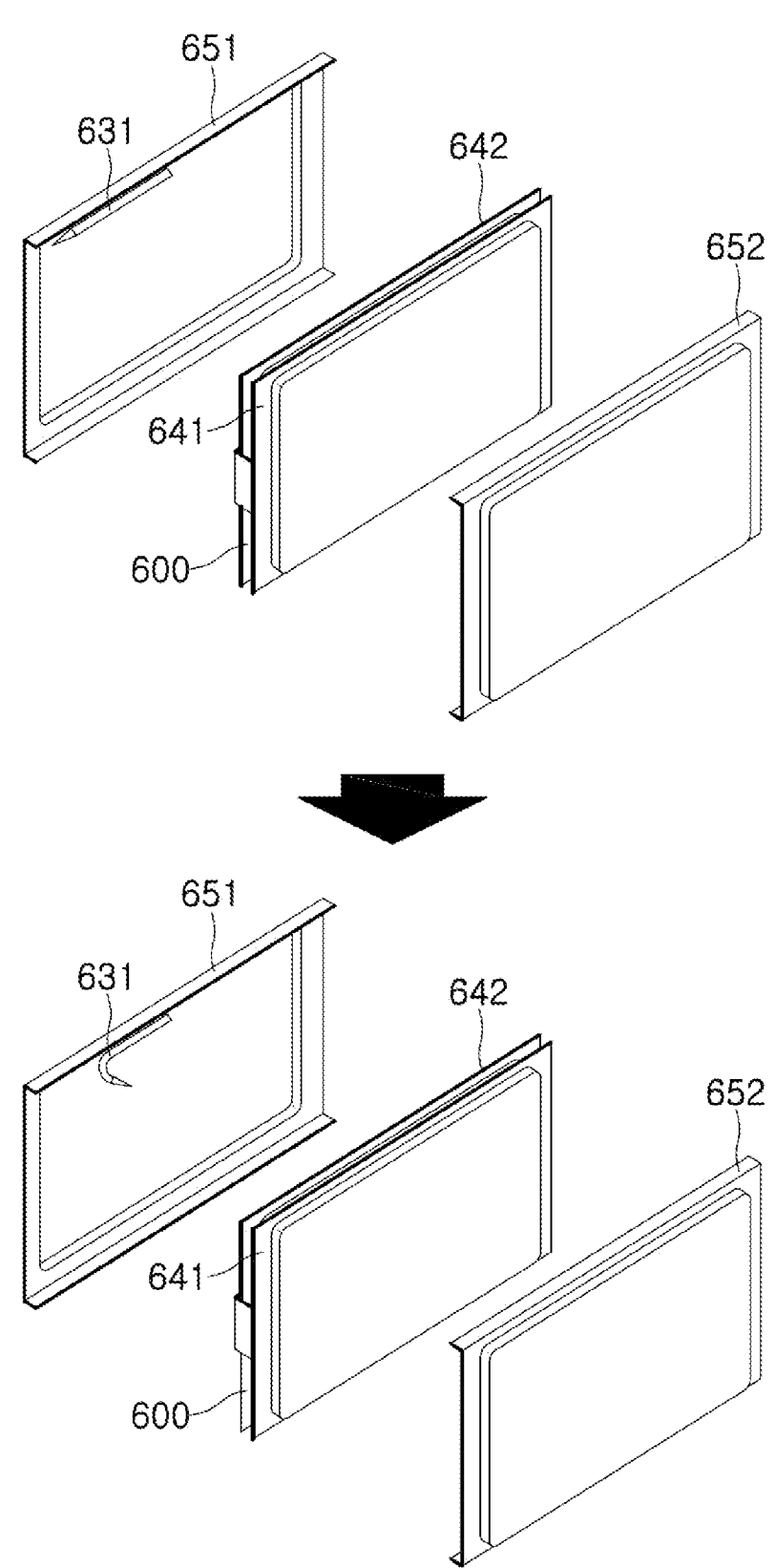
FIG. 7 is an exploded view showing a battery pack including a pouch-type battery cell and a venting member.

In this regard, FIG. 7 shows an exploded view of a battery module including a pouch-type battery cell and a venting member.

Referring to FIG. 7, the battery module includes a pair of housings 651 and 652 surrounding an outer surface of a pouch-type battery cell 600. A venting member 631 is disposed at a position facing a sealing part 642 in a direction in which electrode terminals of the pouch-type battery cell 600 are not disposed, which is an inner surface of the housing 651.

In addition, unlike what is shown in FIG. 7, the battery module according to the present invention may have a form in which a venting member is added to an inner surface of a housing facing a sealing part 641 in a direction in which electrode terminals are disposed.

The vent member 631 may be bent toward the pouch-type battery cell 600 at the transition temperature to be in a recovered form, and thus, a through hole for discharging gas may be formed in the battery case by recovering the venting member.

As shown in FIG. 7, since the venting member is added to a portion treated as dead space inside the battery module, which is an adjacent portion of the pouch-type battery cell, the size of the battery module may be prevented from being changed due to the addition of the venting member.

The present invention also provides a battery pack configured to receive the pouch-type battery cell or a battery module including the same therein, in which a venting member penetrating a battery case of the pouch-type battery cell by deforming its shape due to a change of temperature may be added to an end plate coupled to an electrode terminal of the pouch-type battery cell or a cooling fin contacting the pouch-type battery cell.

In addition, the venting member may be fixed by mounting a groove, a ring, a clip, or the like to an inner surface of the housing, the end plate, or the cooling fin.

As such, the venting member is not a structure added to the outer surface of the pouch-type battery cell, and may be attached to the end plate or the cooling fin located adjacent to the pouch-type battery cell. Thus, when the venting member becomes in a recovered state above the transition temperature, a through hole for discharging gas may be formed in the battery case while the venting member is being bent toward the pouch-type battery cell.

The structure of the end plate and the cooling fins is not particularly limited, and a structure that does not affect the overall size of the battery pack may be applied even if the venting member is applied to a structure that does not affect the overall size.

As such, since a venting member included in the pouch-type battery cell according to the present invention is made of a shape memory alloy, the venting member may be designed to deform its shape at a temperature requiring gas discharge of the pouch-type battery cell.

As described above, the present invention includes a venting member of the shape memory alloy material, it is possible to prevent the explosion and ignition of the battery cell by venting at a desired temperature.

Those skilled in the art to which the present invention pertains will appreciate that various applications and modifications are possible based on the above description, without departing from the scope of the present invention.

DESCRIPTION OF REFERENCE NUMERALS

10, 20, 30, 131, 231, 232, 331, 332, 431, 531, 631: Venting members
100, 200, 300, 400, 500, 600: Pouch-type battery cells
101, 201, 301, 401, 501: Positive electrode terminals
102, 202, 302, 402, 502: Negative electrode terminals
110, 210, 310, 410, 510: Upper cases
111, 211, 311, 321, 411, 511, 521: electrode assembly receiving parts
120, 320,420, 520: Lower cases
141, 241, 242, 341, 541, 641: Sealing parts where electrode terminals are disposed
441, 442, 642: Sealing parts where electrode terminals are not disposed
540: Bent sealing part
651, 652: Housings

INDUSTRIAL APPLICABILITY

As described above, a pouch-type battery cell according to the present invention can be discharged by forming a through-hole in a battery case at a desired temperature.

In addition, by adding a venting member to the outside of the battery cell, it is possible to prevent a problem that the venting member disposed inside the battery cell causes side reactions with electrolyte and the like.

In addition, since a venting member is added to the surplus space of the battery cell, it is possible to prevent the battery cell from increasing in size due to the addition of the venting member.

The invention claimed is:

1. A battery module, comprising:
a pouch-type battery cell,
a housing configured to receive one or more of the pouch-type battery cells, and
a venting member configured to discharge gas in the pouch-type battery cell,
wherein the venting member is made of a shape memory alloy that is deformed to penetrate a battery case of the pouch-type battery cell when a temperature of the venting member increases to a value above a transition temperature of the shape memory alloy,
wherein the venting member is attached to a position on an inner surface of the housing facing a sealing part of the pouch-type battery cell without contacting the pouch-type battery cell when the temperature of the venting member is below the transition temperature of the shape memory alloy,
wherein the housing includes a pair of housings surrounding an outer surface of the pouch-type battery cell, and
wherein the entire venting member is straight when the temperature of the venting member is at or below the transition temperature, and at least one end of the venting member is bent when the temperature of the venting member is above the transition temperature.

2. The battery module according to claim 1,
wherein the position to which the venting member is attached faces the sealing part in a direction in which electrode terminals of the pouch-type battery cell are disposed.

3. The battery module according to claim 1,
wherein the position to which the venting member is attached faces the sealing part in a direction in which electrode terminals of the pouch-type battery cell are not disposed.

4. The battery module according to claim 1,
wherein a deformed portion of the venting member has a pointed end.

5. The battery module according to claim 1,
wherein the pouch-type battery cell includes a battery case having a metal layer and a polymer resin layer and an electrode assembly disposed within the battery case.

6. The battery module according to claim 1,
wherein when the temperature of the venting member is above the transition temperature, the at least one end of the venting member is bent toward an electrode assembly of the pouch-type battery cell.

7. The battery module according to claim 1,
wherein the venting member is attached to the position on the inner surface of the housing with adhesive material or tape.

* * * * *